United States Patent [19]

Froehlich et al.

[11] Patent Number: 4,983,083
[45] Date of Patent: Jan. 8, 1991

[54] ANCHOR ROD

[75] Inventors: Peter Froehlich, Neuried; Ludwig Gebauer, Olching; Manfred Hartmann, Kaufering; Helmut Mirsberger, Munich; Monika Moench, Landsberg/Lech, all of Fed. Rep. of Germany

[73] Assignee: Hilti Aktiengesellschaft

[21] Appl. No.: 377,489

[22] Filed: Jul. 10, 1989

[30] Foreign Application Priority Data

Jul. 8, 1988 [DE] Fed. Rep. of Germany ....... 3823163

[51] Int. Cl.$^5$ ............................................. F16B 39/02
[52] U.S. Cl. ..................................... 411/82; 411/107; 411/914
[58] Field of Search .................. 411/82, 914, 258, 107, 411/51, 70, 44, 34

[56] References Cited

U.S. PATENT DOCUMENTS

| 739,549 | 9/1903 | Kirk | 411/914 X |
|---------|--------|------|-----------|
| 2,527,128 | 10/1950 | Green | 411/34 |
| 4,100,954 | 7/1978 | Muller et al. | 411/194 X |
| 4,763,396 | 8/1988 | Fischer | 411/82 X |

FOREIGN PATENT DOCUMENTS

| 251999 | 1/1988 | European Pat. Off. | 411/82 |
|--------|--------|--------------------|---------|
| 2258529 | 5/1974 | Fed. Rep. of Germany | 411/51 |
| 3209018 | 9/1983 | Fed. Rep. of Germany | 411/82 |
| 3220936 | 12/1983 | Fed. Rep. of Germany | 411/44 |
| 1578146 | 11/1980 | United Kingdom | 411/82 |

Primary Examiner—Rodney M. Lindsey
Attorney, Agent, or Firm—Toren, McGeady & Associates

[57] ABSTRACT

An anchor rod has an axially extending anchoring region including an axially extending expansion section widening in the direction the rod is inserted into a borehole in a structural component. The anchor rod is held in the borehole by a hardenable mortar compound. The mortar compound is prevented from adhering to the anchoring region. Since the mortar compound does not bond to the anchor rod, if there is relative movement between the anchor rod and the hardened mortar compound, the expansion section develops compressive force deviating from the rod axis and acting on the mortar compound, while the compound maintains composite action with the structural component, particularly in a fractured tension zone of the structural component.

24 Claims, 2 Drawing Sheets

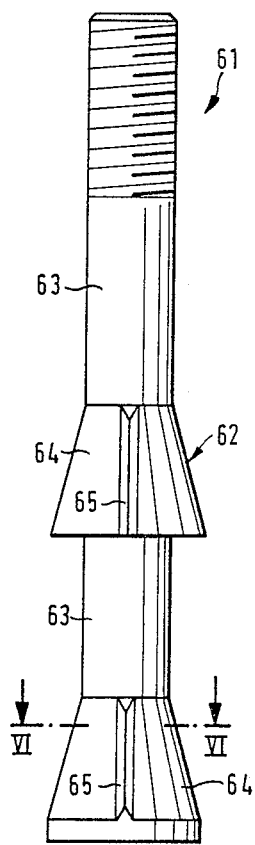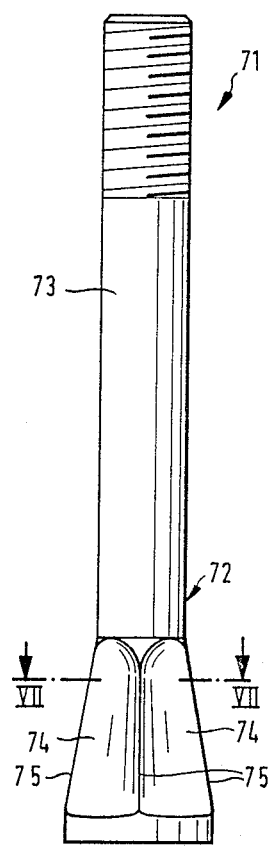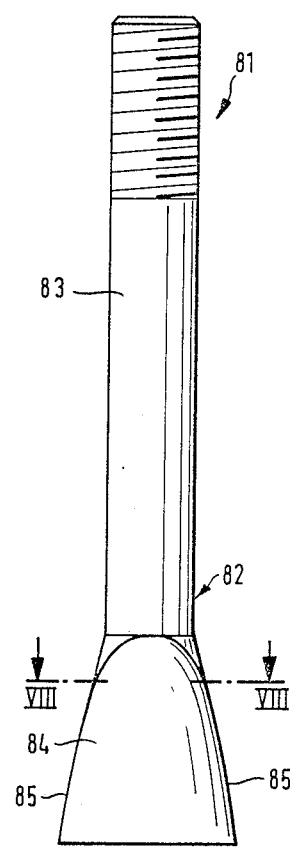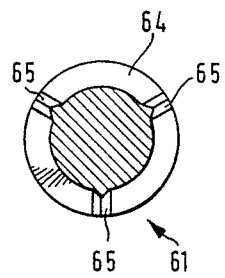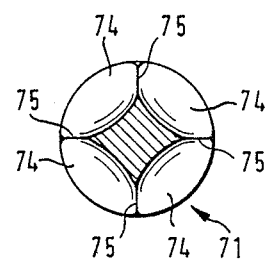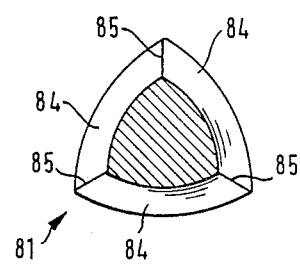

4,983,083

ANCHOR ROD

SUMMARY OF THE INVENTION

The present invention is directed to securing an anchor rod in an opening in a structural component by means of a hardenable mortar compound, where an anchoring region of the anchor rod, at least in part, has a cross section widening in the direction in which the rod is inserted into the structural component.

To implement anchorage in concrete or stone structural components, it has been known to secure anchor rods in openings in the structural component by means of a hardenable mortar compound. Such an anchor is disclosed in DE-PS 24 26 618, where an anchor rod having a widening cross section is used. Hardenable water compounds include hydraulically bound, substantially inorganic compounds, and/or compounds of organic binding materials, including possibly filling materials, such as so-called synthetic resin mortars. As an example, mortars, based on polyester, are known. In addition to mortars of the abovementioned type, mortar compounds, based on acrylate resins, epoxy acrylic resins, epoxy resins and polyurethane systems have also proved to be successful. Generally, two-component systems are employed, fed separately into the opening and, subsequently, mixed therein. Alternatively, the two components are mixed in a special device outside of the opening and subsequently introduced into the opening.

Since structural components of the above-mentioned type have only a relatively low tensile strength, cracks often occur in the tension zone. If an anchor, as described above, is secured in the tension zone of such structural components, it is possible that the anchor may be located in an area of one or more cracks which, in an unfavorable situation, may intersect. As a result, an axial displacement takes place between the mortar and the surface of the opening of such an intensity that a complete failure of the anchor may take place. The likelihood of such a failure is extremely high with cracks which vary in length as a result of changes in load.

SUMMARY OF THE INVENTION

The primary object of the present invention is to provide an anchor of the type described above which insures, above all in a cracked tension zone, sufficient anchoring values, particularly for dynamically loaded structural components.

In accordance with the present invention, means are used along with the anchor rod for preventing adhesion or bonding between the anchor rod and the hardened water compound. Means counteracting adhesion are effective in the anchoring region and in the region of contact of the anchor rod with the hardened mortar. The significant feature of the invention is the lack of any adhesion or bonding between the anchor rod and the hardened mortar compound.

In structural components which are not cracked or fractured, the anchor rod is secured in the hardened mortar compound in a positive locking manner by virtue of an expanding or widening cross section on the rod. Sufficient composite action is present between the surface of the opening and the mortar compound.

In fractured structural components, the tension load acting on the anchor rod in the region of the expanding cross section of the rod can lead to a breaking up of the hardened mortar compound, possibly after prior plastic deformation, since relative displacement can take place due to the absence of adhesion between the hardened water compound and the anchor region of the anchor rod. Such breaking up or splitting of the hardened mortar compound generally causes the development of mortar sections pressed against the surface of the opening due to the action of the widened cross section of the anchor rod. Accordingly, though the composite action between the surface of the opening and the hardened mortar compound is eliminated to a great extent because of the axial tension forces acting on the anchor rod, compressive forces develop which deviate from the axis of the anchor rod in such a way that failure of the anchorage is prevented. In particular, it has been noted that the composite action remains intact in the outer region of the opening between the opening surface and the hardened mortar compound, probably due to the lack of adhesive connection between the mortar compound and the anchor rod.

In one embodiment of the invention, means for preventing adhesion or bonding between the anchor rod and the hardened mortar compound can be included in the mortar compound. In such a situation, it is not important whether the mortar compound is mixed initially within the opening when using a multiple-component system or that it is mixed when it is introduced into the opening. Means which counteract the hardening of the mortar compound in the region of its contact with the anchor rod can consist of compounds which exhibit a hardening inhibiting effect under the influence of the metals and metal ions of the anchor rod in the region of contact with the mortar compound, either because they are formed only under such influence, or for reasons of catalysis, or because the hardeners are deactivated or dissolved in the contact region under these conditions. The result depends on the systems being used. As an example, hydroquinones or cresols can be used in epoxy acrylates, such as 2,6-di-tert butyl-p-cresol.

In another embodiment, the means for preventing adhesion between the anchoring region of the anchor rod and the hardened mortar compound can be incorporated in the anchor rod.

In this embodiment, the anchor rod includes means in its anchoring region which prevent the hardening of &:he mortar compound in the region of its contact with the anchoring region of the rod. Such means for counteracting the hardening of the mortar compound in the region of contact can be in the form of a coating, such as varnish, on the surface of the rod in its anchoring region. The rod surface can be provided with a metal or metal ions incorporated into the coating.

When varnish is used as the coating, for example, t-butylcatechin can be mixed with the coating, particularly where radically hardening reaction resin systems are employed. The same effect is achieved when a varnish is used, such as phenol resin varnish, which prevents the hardening of the mortar compound in the contact region. Coatings comprising a metal can be applied, for instance, by electroplating, where copper is suitable for use in radically hardening reaction resin systems. Coatings formed of metal or metal ions containing additional material counteracting the hardening of the mortar compound in the contact region can also be applied. Such coatings can be deposited by dipping the anchor rods in a metal salt containing an aqueous solution or by coating with a corresponding metal salt containing binders. The use of a corresponding metal containing material for the anchor rod, such as brass, produces the same effect as such coatings.

To prevent adhesion with the hardened mortar compound, preferably the anchor rod has a separate parting agent counter-acting bonding action, with the parting agent located on the surface of the anchoring region of the rod. Such a parting agent can be a plastics material or other material having a conventional sliding characteristic known as such in other fields. As an example, the parting agent can be based on polysiloxan, polyolefin, polytetrafluoroethylene, polyethylene, polypropylene and the like. Further, lubricants such as graphite, zinc sulfide molybdenum disulfide, metallic soaps, waxes and the like can be used. Such parting agents can be applied by dipping, spraying, painting the like, and suitable materials can also be placed on the anchor rod, such as shrink tubing, foils or shaped parts.

It is also possible to inhibit bonding between the anchor rod and the hardened mortar compound by including inhibiting means in the surface finish of the anchoring region of the rod. This inhibiting feature can be achieved with a lubricant, as well as with a high quality surface obtained by means of polishing or with a super finish.

If a slight adhesion occurs between the anchoring region of the rod and the hardened mortar compound, it is insignificant with regard to the desired functioning of the anchorage, according to the invention, since a separation between the hardened mortar compound and the anchor rod is effected when a slight force is applied. As a result, the means preventing or inhibiting adhesion not only provide adhesion prevention, but also keep the adhesion so slight that any displaceability of the anchor rod accompanied by a given load during the development of cracks in the structural component is not impeded.

To eliminate a possible residual adhesion, mechanical steps can be taken, such as the introduction of force to the anchor rod by percussive impact or by vibration. In this way it is possible to eliminate any adhesion between the anchor rod and the hardened mortar compound. The best way to prevent adhesion between the hardened mortar compound and the anchor rod involves the mechanical steps of percussion impact or vibration. It is also possible to prevent adhesion by thermal means.

It has been found that sufficient splitting or breaking, possibly after prior plastic deformation of the hardened mortar compound, as well as the introduction of force on the compound via the anchor rod, depends to a significant extent on the construction or configuration of the transverse cross section of the expansion region in the anchoring region of the anchor rod. Accordingly, a cone-shaped expansion section of the anchoring region, with a cone angle in the range of 10° to 90°, and preferably between 10° and 60°, has proven successful. Moreover, the cone-shaped expansion section is particularly suitable when the largest cross section of the expansion section is not more than seven times, preferably not more than four times, the smallest shank cross section of the anchoring region.

In place of linear, cone-shaped expansion sections, an expansion section with a concave or convex surface can also be used, and it is advantageous if such shaped surfaces fall in the above-mentioned angular regions. In addition to one expansion section, a plurality of such sections, for instance, two, facing in the same direction or in opposite directions, can be located one behind the other in the axial direction.

As viewed transversely of the axial direction, the expansion sections can have a circular or polygonal shape. Anchor rods with a polygonal transverse cross section in the expansion section have the advantage that an additional safeguard against twisting is afforded. Such a safeguard against twisting or turning is particularly decisive in the initial loading phase of the anchor rod if the rod is loaded along with the application of torque.

With respect to the cross sectional configuration of a polygonal transverse section, various shapes are possible. In particular, the transverse cross section can be convex or concave.

Moreover, expansion sections with a polygonal configuration provide edges extending in the axial direction of the anchor rod, and such edges can be used for splitting or breaking the mortar compound in a defined manner, possibly after previous plastic deformation. This breaking effect can be enhanced by arranging additional axially extending ribs along the anchoring region of the rod.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIGS. 2-6 display additional embodiments of the anchor rod incorporating the present invention;

FIG. 6a is a cross sectional view taken along line VI—VI of the anchor rod shown in FIG. 6;

FIG. 7 is a side view of another embodiment of the anchor rod incorporating the present invention;

FIG. 7a is a sectional view through the anchor rod illustrated in FIG. 7, and taken along the line VII—VII;

FIG. 8 is still another embodiment of the anchor rod incorporating the present invention; and FIG. 8a is a sectional view through the anchor rod displayed in FIG. 8, and taken along the line VIII—VIII.

DETAILED DESCRIPTION OF THE INVENTION

Figure 1:
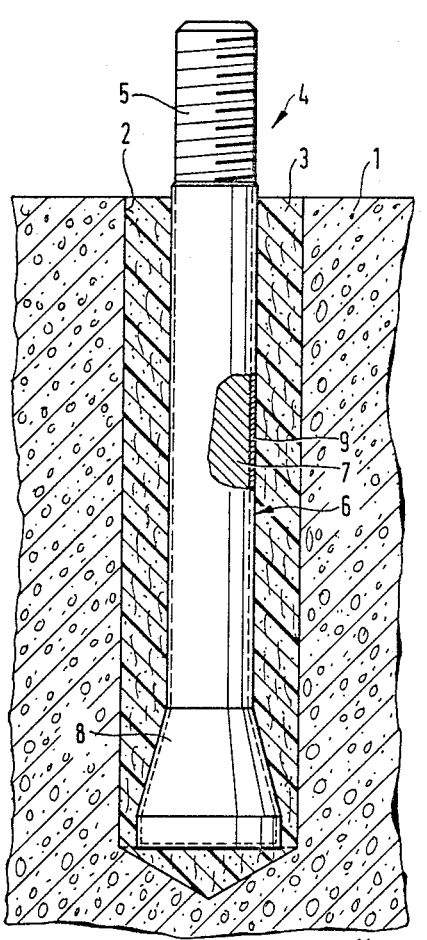
FIG. 1 is a side view, partly in section, of an anchor rod, embodying the present invention, secured in a receiving material.
Figure 1A:
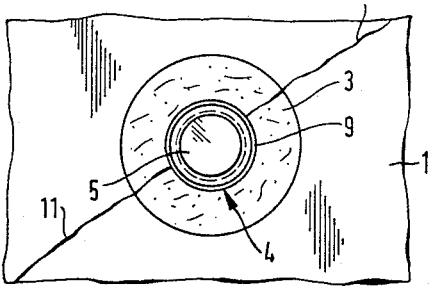
FIG. 1a plan view of the anchor rod shown in FIG. 1.

In FIGS. 1 and 1a, a concrete structural component 1 is shown containing a crack 11 and with an opening 2 in the form of an axially extending cylindrically shaped borehole. Anchor rod 4 is secured or anchored in the borehole 2 by a hardened mortar compound 3. At its trailing end, that is, the end extending out of the structural component 1, the anchor rod 4 has a load applying means 5, in the form of an external thread. The axially extending section of the anchor rod within the borehole 2, serves as the anchoring region 6. Anchoring region 6 includes a cylindrically shaped portion terminating adjacent the leading end of the anchor rod in a conically shaped expansion section 8. The axially extending anchoring region 6 has a coat of varnish 9 providing an inhibiting effect on the hardening of the mortar compound 3 along the contact surface with the rod. Accordingly, there is no adhesive connection or bond with the anchoring region 6, or none worthy of mention, after the mortar compound 3 has hardened or set.

Figure 2:
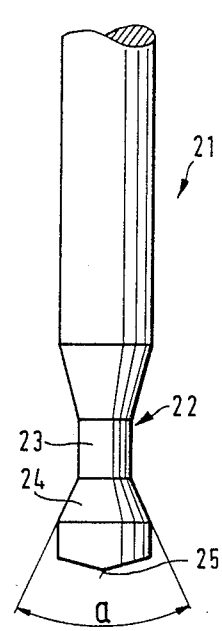

In FIG. 2, an anchor rod 21 is shown with an anchoring region 22. Anchoring region 22 has an axially extending cylindrical portion 23 in the form of a narrowed or bottle-necked section with an effective expansion section 24 located at the leading end of the section 23. Accordingly, the point of application of resultant force, deviating from the axis of the anchor rod 21, is located within the diameter of the anchor rod. The cone angle a, of the expansion section 24, is approximately 60°. The leading end of the expansion section 24 has a cutting edge 25 with the surfaces on the opposite sides of the cutting edge sloping toward the trailing end of the rod.

Figure 3:
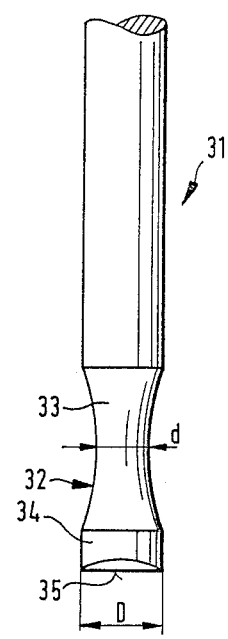

In FIG. 3, an anchor rod 31 is displayed having an anchoring region 32 with a section 33 of reduced cross sectional area or reduced diameter d, with an expansion section 34, projecting axially to the leading end from the section 33. The expansion section has a diameter D. Further, expansion section 34 has a cutting edge 35 with opposite sloping surfaces, similar to FIG. 2.

Figure 4:
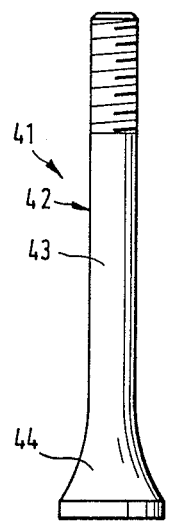

In FIG. 4, an anchor rod 41 is depicted with an axially extending anchoring region 42 including a cylindrical section 43 and an expansion section 44 located at the leading end. The expansion section 44, widening toward the leading end, has a concavely-shaped outer surface.

Figure 5:
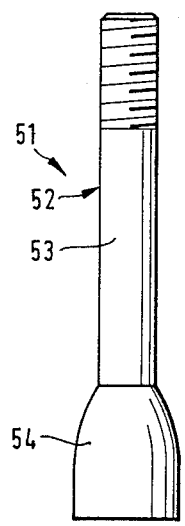

Another embodiment of the present invention is displayed in FIG. 5, with an anchor rod 51 having an axially extending anchoring region 52 formed by a cylindrical section 53, with an expansion section 54 extending from the cylindrical section 53 to the leading end of the rod. Expansion section 54 has a axially extending convex surface extending from the cylindrical section toward the leading end.

FIG. 6 displays another embodiment of the present invention comprising an axially extending anchor rod 61 with an axially extending anchoring region 62. Anchoring region 62 includes two axially extending cylindrical sections 63 spaced from one another by one cone-shaped expansion section 64, with a second cone-shaped expansion section 64, located at the leading end of the anchor rod projecting axially from the adjoining cylindrical section 63.

The expansion section 64 have axially extending ribs 65 on the outside surface spaced circumferentially apart, as can be seen in FIG. 6a. Ribs 65 promote the splitting or breaking of the hardened mortar compound.

In FIG. 7, another anchor rod 71 is illustrated having an axially extending anchoring region 72 formed of an axially extending cylindrical section 73 and a cone-shaped expansion section 74 widening toward the leading end. Expansion section 74 has a polygonally-shaped transverse section made up of four separate surfaces, each having a concave shape, note FIG. 7a. At the transitions between the four surfaces, there are four axially extending edges 75.

In FIG. 8, yet another embodiment of an anchoring rod 81, incorporating the present invention is illustrated, having an axially extending anchoring region 82 formed of an axially extending cylindrical section 83, and a cone-shaped expansion section 84, extending axially outwardly from the cylindrical section. The expansion section 84 has a polygonal transverse section with its surface formed of three convexly shaped surfaces.

The transitions between each of the surfaces form three edges 85, extending in the axial direction, note FIG. 8a.

Additional protection against rotation of the anchor rod 71, 81, about its own axis relative to the hardened mortar compound is obtained by the polygonal cross sectional shape of the expansion section 74, 84, in FIG. 7 and 8. Edges 75, 85, of the expansion sections 74, 84, insure a defined splitting or breaking of the hardened mortar compound, possibly after prior plastic deformation.

The anchor rods displayed in FIGS. 2 to 8 correspond to the embodiment set forth in FIG. 1, wherein the prevention of adhesion between the mortar compound and the anchor rod, can be achieved in each of the embodiments. The anchor rod can be shaped as a function of the application and the mortar compounds being employed. The anchor rods preferably have a cutting edge extending across the leading end with the surfaces of the leading end sloping rearwardly from the cutting edge in each application where the mortar compounds are mixed inside the borehole or opening in the structural component.

While specific embodiments of the invention have been shown and described in detail to illustrate the application of the inventive principles, it will be understood that the invention may be embodied otherwise without departing from such principles.

We claim:

1. An anchor unit to be anchored in an opening in a structural component comprising a hardenable mortar compound, and an axially extending anchor rod having a leading end to be inserted first into the opening and a trailing end, said anchor rod having an axially extending expansion section with at least an axially extending part widening in the direction toward the leading end, wherein the improvement comprises means for preventing adhesion between said anchor rod and the hardened mortar compound, said anchor rod has an axially extending anchoring region, said anchoring region defining said axially extending expansion section widening toward the leading end of said anchor rod, said expansion section being conically shaped, said conically shaped expansion section having a plurality of spaced ribs extending in the axial direction and projecting outwardly from said conically shaped expansion section.

2. An anchor unit, as set forth in claim 1, wherein said means is located in said mortar compound for counteracting hardening of said mortar compound in a region of contact with the anchor rod.

3. An anchor unit, asset forth in claim 1, wherein said means for preventing adhesion is included with said anchor rod.

4. An anchor unit, as set forth in claim 3, wherein said means for preventing adhesion comprise a coating on the surface of the anchoring region of said anchor rod.

5. An anchor unit, as set forth in claim 4, wherein said coating comprises a varnish.

6. An anchor unit, as set forth in claim 4, wherein said coating comprises a metal.

7. An anchor unit, as set forth in claim 1, wherein said means for preventing adhesion comprises a separating element on the surface of an anchoring region of the anchor rod for counteracting the adhesive connection of the anchor rod with the hardened mortar compound.

8. An anchor unit, as set forth in claim 1, wherein said means for preventing adhesion comprises a surface finish on an anchoring region of the anchor rod for counteracting adhesive connection with the hardened mortar compound.

9. An anchor unit, as set forth in claims 2 or 3, wherein said expansion section having a cone angle in the range of 10° to 90°.

10. Anchor rod, as set forth in claim 9, wherein the cone angle is in the range of 10° to 60°.

11. An anchor unit, as set forth in claims 2 or 3, wherein said expansion section being polygonally shaped and having a cone angle in the range of 10° to 90°.

12. An anchor unit, as set forth in claim 11, wherein said cone angle is in the range of 10° to 60°.

13. An anchor unit, as set forth in claim 11, wherein said polygonally shaped expansion section has convexly shaped surfaces.

14. An anchor unit, as set forth in claim 11, wherein said polygonally shaped expansion section has concavely shaped surfaces.

15. An anchor unit, as set forth in claim 11, wherein said polygonally shaped expansion section has axially extending rib-like edges.

16. An anchor unit, as set forth in claim 9, wherein said expansion section has a transverse cross-sectional area in the range of seven times the smallest cross sectional area of the anchoring region of said anchor rod.

17. An anchor unit, as set forth in claim 16, wherein said expansion section has a transverse cross-sectional area of approximately four times the smallest transverse cross sectional area of said anchoring region of said anchor rod.

18. An anchor unit, as set forth in claim 1, wherein said mortar compound is a hydraulically bound mortar compound comprising cement.

19. An anchor unit, as set forth in claim 1, wherein said hardenable mortar compound comprises organic binding materials.

20. An anchor unit, as set forth in claim 19, wherein said organic binding materials comprises at least one of the group consisting of polyester resins, acrylate resins, epoxy acrylate resins, epoxy resins and polyurethane resins.

21. An anchor unit, as set forth in claim 20, wherein said organic binding materials include filling materials.

22. An anchor unit, as set forth in claim II, wherein said expansion section has a transverse cross-sectional area in the range of seven times the smallest cross sectional area of the anchoring region of said anchor rod.

23. An anchor unit, as set forth in claim 1, wherein said anchoring region has one said conically shaped expansion section at the leading end thereof and a second said conically shaped expansion section spaced from the one conically shaped expansion section by an axially extending cylindrical section.

24. An anchor unit, as set forth in claim 23, wherein a second axially extending cylindrical section extends from said second expansion section toward the trailing end of said anchor rod, and spaces said expansion sections apart, and a plurality of axially extending spaced ribs projection outwardly from said second expansion section.

* * * * *